United States Patent
Pudleiner et al.

(10) Patent No.: US 9,446,619 B2
(45) Date of Patent: *Sep. 20, 2016

(54) PLASTIC FILM FOR PRINTING BY DYE DIFFUSION THERMAL TRANSFER PRINTING

(71) Applicant: Covestro Deutschland AG, Leverkusen (DE)

(72) Inventors: Heinz Pudleiner, Krefeld (DE); Klaus Meyer, Dormagen (DE); Georgios Tziovaras, Wuppertal (DE); Mehmet-Cengiz Yesildag, Leverkusen (DE); Chung Leung Wong, Hong Kong (CN)

(73) Assignee: Covestro Deutschland AG, Leverkusen (DE)

( * ) Notice: Subject to any disclaimer, the term of this patent is extended or adjusted under 35 U.S.C. 154(b) by 24 days.

This patent is subject to a terminal disclaimer.

(21) Appl. No.: 14/372,486

(22) PCT Filed: Jan. 16, 2013

(86) PCT No.: PCT/EP2013/050754
§ 371 (c)(1),
(2) Date: Jul. 16, 2014

(87) PCT Pub. No.: WO2013/107777
PCT Pub. Date: Jul. 25, 2013

(65) Prior Publication Data
US 2014/0349038 A1    Nov. 27, 2014

(30) Foreign Application Priority Data
Jan. 19, 2012 (EP) .................... 12151747

(51) Int. Cl.
| | |
|---|---|
| B41M 5/52 | (2006.01) |
| B41M 5/50 | (2006.01) |
| B32B 27/08 | (2006.01) |
| B32B 27/36 | (2006.01) |
| C08J 5/18 | (2006.01) |
| C08K 5/524 | (2006.01) |
| C08K 5/529 | (2006.01) |
| B42D 25/00 | (2014.01) |
| B29C 47/00 | (2006.01) |
| B29C 47/06 | (2006.01) |
| B32B 37/14 | (2006.01) |
| C08G 63/199 | (2006.01) |
| B42D 25/455 | (2014.01) |
| B29K 67/00 | (2006.01) |
| B29K 101/12 | (2006.01) |
| B29L 9/00 | (2006.01) |
| B29L 17/00 | (2006.01) |

(52) U.S. Cl.
CPC .......... *B41M 5/502* (2013.01); *B29C 47/0004* (2013.01); *B29C 47/065* (2013.01); *B32B 27/08* (2013.01); *B32B 27/36* (2013.01); *B32B 37/144* (2013.01); *B41M 5/5227* (2013.01); *B41M 5/5272* (2013.01); *B42D 25/00* (2014.10); *C08G 63/199* (2013.01); *C08J 5/18* (2013.01); *C08K 5/524* (2013.01); *C08K 5/529* (2013.01); *B29K 2067/00* (2013.01); *B29K 2101/12* (2013.01); *B29L 2009/00* (2013.01); *B29L 2017/00* (2013.01); *B32B 2367/00* (2013.01); *B32B 2398/20* (2013.01); *B32B 2425/00* (2013.01); *B41M 2205/02* (2013.01); *B41M 2205/04* (2013.01); *B41M 2205/32* (2013.01); *B42D 25/455* (2014.10); *B42D 2033/30* (2013.01); *B42D 2035/06* (2013.01); *C08J 2367/02* (2013.01); *Y10T 156/10* (2015.01)

(58) Field of Classification Search
CPC .... B41M 2205/02; B41M 5/50; B41M 5/52; B41M 5/5218; B41M 5/5227; B41M 5/5272; Y10T 428/31786; Y10T 428/31797
USPC .......................... 503/227; 428/480, 48, 483
See application file for complete search history.

(56) References Cited

U.S. PATENT DOCUMENTS

| | | | |
|---|---|---|---|
| 3,209,013 | A | 9/1965 | Hechenbleikner et al. |
| 3,692,744 | A | 9/1972 | Vaginay |
| 3,794,629 | A | 2/1974 | Eimers et al. |
| 4,176,224 | A | 11/1979 | Bier et al. |
| 4,368,240 | A | 1/1983 | Nauta et al. |
| 5,326,741 | A | 7/1994 | Kushi et al. |
| 5,334,573 | A | 8/1994 | Schild |
| 5,658,846 | A | 8/1997 | Slark |
| 5,928,780 | A | 7/1999 | Schmidt et al. |
| 6,693,657 | B2 | 2/2004 | Carroll et al. |
| 2007/0295689 | A1 | 12/2007 | Clauss et al. |

FOREIGN PATENT DOCUMENTS

| | | | |
|---|---|---|---|
| DE | 1900270 A | | 11/1969 |
| DE | 2140207 A | | 2/1973 |

(Continued)

OTHER PUBLICATIONS

English Translation of the International Preliminary Report on Patentability and Written Opinion for PCT/EP2013/050754 mailed on Jul. 31, 2014.

(Continued)

*Primary Examiner* — Bruce H Hess
(74) *Attorney, Agent, or Firm* — Drinker Biddle & Reath LLP

(57) ABSTRACT

The invention relates to a special layer construction and a special film of plastic for the production of such a layer construction which is suitable for printing by means of dye diffusion thermal transfer printing, a process for the production thereof and a security and/or valuable document comprising such a layer construction.

15 Claims, No Drawings

(56) References Cited

FOREIGN PATENT DOCUMENTS

| DE | 2407674 | A1 | 10/1974 |
| DE | 2407776 | A1 | 9/1975 |
| DE | 2715932 | | 10/1978 |
| DE | 19522397 | A | 1/1997 |
| EP | 0150497 | A2 | 8/1985 |
| EP | 0373465 | A2 | 6/1990 |
| EP | 0557990 | * | 9/1993 ............ B41M 5/00 |
| EP | 673778 | B1 | 9/1995 |
| EP | 1452331 | A2 | 9/2004 |
| GB | 1464449 | A | 2/1977 |
| JP | 2003-208589 | A | 7/2003 |
| WO | WO-98/07573 | A1 | 2/1998 |
| WO | WO-2004/050766 | A | 6/2004 |
| WO | WO-2004/050767 | A | 6/2004 |
| WO | WO-2006/042714 | A1 | 4/2006 |

OTHER PUBLICATIONS

Ashton et al., "The Role of Phosphites in Stabilization of Non-Polyolefin Polymers", Plastics—The Magical Solution: Conference Proceedings, vol. 3, pp. 2818-2825, Antec 2000 (May 7-11, 2000 Orlando Florida Society of Plastic Engineers).
International Search Report for PCT/EP2013/050754 mailed Mar. 4, 2013.

* cited by examiner

PLASTIC FILM FOR PRINTING BY DYE DIFFUSION THERMAL TRANSFER PRINTING

CROSS-REFERENCE TO RELATED APPLICATIONS

This application is a national stage application (under 35 U.S.C. §371) of PCT/EP2013/050754, filed Jan. 16, 2013, which claims benefit of European Application No. 12151747.8, filed Jan. 19, 2012, both of which are incorporated herein by reference in their entirety.

The invention relates to a special layer construction and a special film of plastic for the production of such a layer construction which is suitable for printing by means of dye diffusion thermal transfer printing, a process for the production thereof and a security and/or valuable document comprising such a layer construction.

In the production of security and/or valuable documents, in particular identification documents in the form of cards (ID cards), there is the need for coloured personalization of the documents, but without lowering the forgery security thereof. The application of coloured layers which, within the ID cards, due to the lack of compatibility with the layers of plastic surrounding them, would allow the possibility of subsequent breaking open and modification of the information is therefore to be avoided. In the past there have been many different set-ups for eliminating this problem and rendering possible a coloured personalization with a high forgery security.

One of these consists of the use of dye diffusion thermal transfer printing of coloured information on substrates of plastic as an alternative to other printing processes, since this offers the advantage of a high image accuracy in coloured printing, and images and information personalized on the spot can also be printed in good quality by this means. In this printing variant the printing ink furthermore should be absorbed into the plastics material to be printed, so that no intentional breaking sites for subsequent separation are formed by a separate colour layer in the documents.

If substrates of plastic are used for such printing, however, there is the problem that the surface of the substrate of plastic must offer an adequate absorbency for the printing ink, without the image sharpness and colour intensity thereby being impaired. In many cases, the colour intensity of the printed images in particular is in need of improvement.

Diverse plastics materials have already been discussed in the literature for printability by means of dye diffusion thermal transfer printing. Thus, according to Stark et al., Polymer 40 (1999) 4001-4011 diverse plastics are suitable as materials for dye acceptor coatings, but without concrete preferences being mentioned there. WO 98/07573 A1 discloses dye acceptor coatings of polyvinyl chloride copolymers. In Shearmur et al., Polymer 37, vol. 13 (1996) 2695-2700, diverse polyesters and polyvinyl butyral are investigated as possible materials for dye acceptor layers. None of these documents, however, is concerned with the colour intensity or image sharpness of the printed images achieved.

U.S. Pat. No. 5,334,573 investigates suitable materials with the aim of avoiding sticking of the dye acceptor sheets to the dye donor sheets.

EP 673 778 B1 discloses thermotransfer receiver films with a coated, metallized polymer surface as the receiver film. Plastics, such as PVC, vinyl acetate/vinyl chloride copolymers, polyvinylidene acetals, PMMA and silicone surfaces based on polymers are mentioned here in particular for the receiver layer. Merely on the basis of the metallized surface, however, such films are excluded in view of the formation of intentional breaking sites in security and/or valuable documents.

There accordingly continues to be a need to provide dye receiver films or layers in which the colour intensity of the printed image when printing by means of dye diffusion thermal transfer printing is improved. In particular, this effect should be achieved without at the same time impairing the image sharpness of the printed image.

The present invention was therefore based on the object of discovering films or layers which can be printed by means of dye diffusion thermal transfer printing, the colour intensity of the printed image being improved. A further object was that when these films or layers are employed in dye diffusion thermal transfer printing, the image sharpness is not impaired substantially or detectably with the naked eye.

This object has been achieved, surprisingly, in that a layer or film comprising a polyester component comprising at least one poly- or copolycondensate of terephthalic acid or naphthalenedicarboxylic acid is used as the dye acceptor layer or dye acceptor film, wherein the polyester component comprises in total radicals of cyclohexane-1,4-dimethanol in an amount of from 25 to 75 mol %, based on the radicals of the diol component(s) in all the poly- or copolycondensates of terephthalic acid or naphthalenedicarboxylic acid which the polyester component comprises. By using this special polyester component in the layers or films, the colour intensity of the printed image, surprisingly, is significantly improved.

The present invention accordingly provides a layer construction comprising
  at least one layer (A) comprising at least one thermoplastic and
  at least one layer (B) comprising a polyester component comprising at least one poly- or copolycondensate of terephthalic acid or naphthalenedicarboxylic acid,
characterized in that the polyester component comprises radicals of cyclohexane-1,4-dimethanol in an amount of from 25 to 75 mol %, based on the radicals of the diol component(s) in all the poly- or copolyesters which the polyester component comprises. The polyester component, which comprises as radicals of one or more diol components those of cyclohexane-1,4-dimethanol in an amount of from 25 to 75 mol %, based on the radicals of the diol component(s) in all the poly- or copolyesters which the polyester component comprises, is also abbreviated to cyclohexane-1,4-dimethanol-modified polyester component in the following.

According to the invention, the polyester component of the layer (B) comprises at least one poly- or copolycondensate of terephthalic acid or naphthalenedicarboxylic acid. Preferably, the polyester component comprises one or more poly- or copolycondensates of terephthalic acid or naphthalenedicarboxylic acid and optionally poly- or copolycondensates which are not those of terephthalic acid or naphthalenedicarboxylic acid. Preferably, however, the polyester component comprises as the polyester one or more poly- or copolycondensates of terephthalic acid or naphthalenedicarboxylic acid and no poly- or copolycondensates which are not those of terephthalic acid or naphthalenedicarboxylic acid. In preferred embodiments, the polyester component therefore has as the poly- or copolyester one or more poly- or copolycondensates of terephthalic acid or naphthalenedicarboxylic acid.

Preferably, the polyester component comprises radicals of cyclohexane-1,4-dimethanol in an amount of from 25 to 75 mol %, based on the radicals of the diol component(s) in all the poly- or copolycondensates of terephthalic acid or naphthalenedicarboxylic acid which the polyester component comprises.

According to the invention, the cyclohexane-1,4-dimethanol-modified polyester component can comprise one or more poly- or copolycondensate of terephthalic acid or naphthalenedicarboxylic acid. In the case where the polyester component comprises several poly- or copolycondensates of terephthalic acid or naphthalenedicarboxylic acid, one or more of these poly- or copolycondensates of terephthalic acid or naphthalenedicarboxylic acid can comprise the radicals of the diol component cyclohexane-1,4-dimethanol in different amounts, so that in total the total amount mentioned according to the invention of from 25 to 75 mol %, based on the radicals of the diol component(s) in all the poly- or copolyesters which the polyester component comprises, preferably based on the radicals of the diol component(s) in all the poly- or copolycondensates of terephthalic acid or naphthalenedicarboxylic acid which the polyester component comprises, is reached.

Suitable poly- or copolycondensates of terephthalic acid or naphthalenedicarboxylic acid for the cyclohexane-1,4-dimethanol-modified polyester component are, for example, poly- or copolycondensates of terephthalic acid or naphthalenedicarboxylic acid which have radicals of cyclohexane-1,4-dimethanol, such as, for example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN), which in each case have radicals of cyclohexane-1,4-dimethanol, or mixtures of the abovementioned. Mixtures of the abovementioned with poly-(cyclohexane-1,4-dimethanol) terephthalate or poly-(cyclohexane-1,4-dimethanol) naphthalate are furthermore also suitable. Poly- or copolycondensates of terephthalic acid or naphthalenedicarboxylic acid which comprise no radicals of cyclohexane-1,4-dimethanol can furthermore be admixed to the cyclohexane-1,4-dimethanol-modified polyester component.

Suitable poly- or copolycondensates of terephthalic acid or naphthalenedicarboxylic acid are preferably poly- or copolyalkylene terephthalates or poly- or copolyalkylene naphthalates. Suitable poly- or copolyalkylene terephthalates or poly- or copolyalkylene naphthalates are, for example, reaction products of aromatic dicarboxylic acids or their reactive derivatives (e.g. dimethyl esters or anhydrides) and aliphatic, cycloaliphatic and/or araliphatic diols, particularly preferably reaction products of aromatic dicarboxylic acids or their reactive derivatives (e.g. dimethyl esters or anhydrides) and aliphatic and/or cycloaliphatic diols, and mixtures of these reaction products.

Preferred poly- or copolycondensates of terephthalic acid or naphthalenedicarboxylic acid optionally comprising cyclohexane-1,4-dimethanol radicals can be prepared from terephthalic acid or naphthalene-2,6-dicarboxylic acid (or their reactive derivatives) and aliphatic or cycloaliphatic diols having 2 to 10 C atoms by known methods (Kunststoff-Handbuch, vol. VIII, p. 695 et seq., Karl-Hanser-Verlag, Munich 1973).

Preferred poly- or copolycondensates of terephthalic acid or naphthalenedicarboxylic acid optionally comprising cyclohexane-1,4-dimethanol radicals comprise at least 80 mol %, preferably 90 mol % of radicals which result from using terephthalic acid or naphthalenedicarboxylic acid, based on the dicarboxylic acid component, in the preparation.

Very particularly preferably, the cyclohexane-1,4-dimethanol-modified polyester component comprises in total radicals of cyclohexane-1,4-dimethanol in an amount of from 30 to 75 mol %, particularly preferably from 40 to 75 mol %, very particularly preferably from 50 to 75 mol %, based on the radicals of the diol component(s) in all the poly- or copolyesters which the polyester component comprises, preferably based on the radicals of the diol component(s) in all the poly- or copolycondensates of terephthalic acid or naphthalenedicarboxylic acid which the polyester component comprises.

Preferred poly- or copolycondensates of terephthalic acid or naphthalenedicarboxylic acid comprising cyclohexane-1,4-dimethanol radicals preferably comprise as radicals of diol groups at least 80 mol %, preferably at least 90 mol % of those radicals which result from using in the preparation cyclohexane-1,4-dimethanol and additionally ethylene glycol, and/or butane-1,4-diol, based on the diol component.

The preferred poly- or copolycondensates of terephthalic acid or naphthalenedicarboxylic acid comprising cyclohexane-1,4-dimethanol radicals can comprise, in addition to terephthalic acid radicals or naphthalenedicarboxylic acid radicals, up to 20 mol % of radicals of other aromatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid (in the case of polyalkylene terephthalates), terephthalic acid (in the case of polyalkylene naphthalates), 4,4'-diphenyldicarboxylic acid, succinic, adipic, sebacic acid, azelaic acid and/or cyclohexanediacetic acid.

The preferred poly- or copolycondensates of terephthalic acid or naphthalenedicarboxylic acid comprising cyclohexane-1,4-dimethanol can comprise, in addition to radicals of cyclohexane-1,4-dimethanol and optionally ethylene glycol and/or butane-1,4-diol, up to 20 mol %, preferably up to 10 mol % of radicals of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, 3-methylpentane-2,4-diol, 2-methylpentane-2,4-diol, 2,2,4-trimethylpentane-1,3-diol, and 2-ethylhexane-1,6-diol, 2,2-diethylpropane-1,3-diol, hexane-2,5-diol, 1,4-di-([beta]-hydroxyethoxy)-benzene, 2,2-bis-(4-hydroxycyclohexyl)-propane, 2,4-dihydroxy-1,1,3,3-tetramethylcyclobutane, 2,2-bis-(3-[beta]-hydroxyethoxyphenyl)-propane and 2,2-bis-(4-hydroxypropoxyphenyl)-propane (cf. DE-A 24 07 674, 24 07 776, 27 15 932).

Particularly preferred poly- or copolycondensates of terephthalic acid or naphthalenedicarboxylic acid comprising cyclohexane-1,4-dimethanol radicals comprise as radicals of several diol components exclusively those of cyclohexane-1,4-dimethanol and ethylene glycol and/or butane-1,4-diol.

The poly- or copolycondensates of terephthalic acid or naphthalenedicarboxylic acid comprising cyclohexane-1,4-dimethanol radicals can be branched by incorporation of relatively small amounts of 3- or 4-functional alcohols or 3- or 4-basic carboxylic acids, such as are described e.g. in DE-A 19 00 270 and U.S. Pat. No. 3,692,744. Examples of preferred branching agents are trimesic acid, trimellitic acid, trimethylolethane and -propane and pentaerythritol. Preferably, not more than 1 mol % of the branching agent, based on the acid component, is used.

Of the poly- or copolycondensates of terephthalic acid or naphthalenedicarboxylic acid comprising cyclohexane-1,4-dimethanol radicals, the poly- or copolycondensates of terephthalic acid comprising cyclohexane-1,4-dimethanol radicals are particularly preferred.

Polyalkylene terephthalates which comprise cyclohexane-1,4-dimethanol radicals and have been prepared solely from terephthalic acid and reactive derivatives thereof (e.g. dialkyl esters thereof) and cyclohexane-1,4-dimethanol and ethylene glycol and/or butane-1,4-diol, and mixtures comprising such polyalkylene terephthalates, are particularly preferred.

According to the invention, in a preferred embodiment of the invention, one or more abovementioned copolyesters comprising cyclohexane-1,4-dimethanol radicals and further diol and/or polyol radicals can be employed as the polyester component in layer (B). According to the invention, in a further preferred embodiment of the invention, mixtures of one or more of the abovementioned copolyesters comprising cyclohexane-1,4-dimethanol radicals and further diol and/or polyol radicals with poly(cyclohexane-1,4-dimethanol) terephthalate or poly(cyclohexane-1,4-dimethanol) naphthalate can also be employed as the polyester component. In the two abovementioned preferred embodiments, in each case further poly- or copolycondensate(s) of terephthalic acid or naphthalenedicarboxylic acid which have no cyclohexane-1,4-dimethanol radicals can also be admixed, the total mixture then forming the polyester component.

Particularly preferred polyalkylene terephthalates comprising cyclohexane-1,4-dimethanol radicals are also copolyesters which are prepared from at least two of the abovementioned acid components and/or from at least two of the abovementioned alcohol components, and particularly preferred copolyesters are poly(ethylene glycol/cyclohexane-1,4-dimethanol) terephthalates. In preferred embodiments, such copolyesters can be employed in a mixture with poly-(cyclohexane-1,4-dimethanol) terephthalate.

The poly- or copolycondensates of terephthalic acid or naphthalenedicarboxylic acid comprising cyclohexane-1,4-dimethanol radicals preferably have an intrinsic viscosity of from approx. 0.4 to 1.5 dl/g, preferably from 0.5 to 1.3 dl/g, in each case measured in phenol/tetrachloroethane (1:1 parts by wt.) at 25° C.

It is also possible for layer (B) and therefore also the plastics composition for the production thereof to comprise one or more further thermoplastic(s) in addition to the polyester component. Possible such thermoplastics are those mentioned in the following for the layer (A). The plastics composition of the layer (B) preferably comprises at least 50 wt. %, particularly preferably at least 60 wt. %, very particularly preferably at least 70 wt. % of the polyester component, based on the total weight of the plastics composition of the layer (B).

In preferred embodiments of the invention, the layer (B) can comprise at least one polycarbonate or copolycarbonate based on diphenols as a further thermoplastic. Possible such polycarbonates or copolycarbonates based on diphenols are, for example and preferably, those mentioned in the following for the layer (A). Preferably, the plastics composition for the layer (B) comprises 30 wt. % or less, particularly preferably from 0.1 to 25 wt. %, very particularly preferably from 0.5 to 20 wt. % of polycarbonate(s) or copolycarbonate(s) based on diphenols.

The softening temperature of the layer (B) can be increased by the addition of polycarbonate(s) or copolycarbonate(s) based on diphenols. Such an addition of polycarbonate(s) or copolycarbonate(s) based on diphenols can furthermore have the effect of a better adhesion of the layer (B) to adjacent layers comprising polycarbonate(s) or copolycarbonate(s) based on diphenols in security and/or valuable documents, which additionally makes subsequent separation of the documents difficult and increases the forgery security thereof.

In further preferred embodiments, the layer (B) can comprise at least one laser-sensitive additive.

Possible laser-sensitive additives are, for example, so-called laser marking additives, i.e. those of an absorber in the wavelength range of the laser to be used, preferably in the wavelength range of ND:YAG lasers (neodymium-doped yttrium-aluminium-garnet lasers). Such laser marking additives and the use thereof in moulding compositions are described, for example, in WO-A 2004/50766 and WO-A 2004/50767 and are available commercially from DSM under the brand name Micabs®. Absorbers which are furthermore suitable as laser-sensitive additives are carbon black, coated laminar silicates, as described e.g. in DE-A-195 22 397 and commercially obtainable under the brand name Lazerflair®, antimony-doped tin oxide, as described e.g. in U.S. Pat. No. 6,693,657 and commercially obtainable under the brand name Mark-It™, and phosphorus-containing tin/copper mixed oxides, as described e.g. in WO-A 2006/042714. It is preferable for the particle size of the laser-sensitive additive to be in the range of from 100 nm to 10 µm, and particularly advantageous for it to be in the range of from 500 nm to 2 µm. A very particularly preferred laser-sensitive additive is carbon black.

In further preferred embodiments, at least one phosphite can be added to the plastics composition for the production of the layer (B).

Phosphites in the context of the present invention are to be understood as meaning esters of phosphonic acid (often also called phosphorous acid esters) with the general structure $P(OR)_3$, wherein R represents aliphatic, aromatic and/or cycloaliphatic hydrocarbon radicals, preferably aliphatic and/or cycloaliphatic hydrocarbon radicals, wherein the hydrocarbon radicals R can optionally also comprise hetero atoms, such as e.g. oxygen or nitrogen, and wherein the aromatic hydrocarbon radicals can have further substituents, such as, for example, alkyl groups.

Preferred phosphites in the context of the invention are those which comprise at least one oxetane group. Such phosphites containing oxetane groups can comprise one, two or three oxetane groups. Mixtures of several phosphites containing oxetane groups can also be employed. Phosphites containing oxetane groups can be prepared in a manner known to the person skilled in the art, for example by transesterification of alcohols or phenols containing oxetane groups—optionally in a mixture with alcohols or phenols which are free from oxetane groups—with trialkyl or triaryl phosphites or by reaction of phosphorus trichloride with the corresponding alcohols or phenols containing oxetane groups—optionally in a mixture with alcohols or phenols which are free from oxetane groups—in the presence of acid-binding agents (cf. e.g. U.S. Pat. No. 3,209,013).

Examples of alcohols or phenols containing oxetane groups are 3-ethyl-3-hydroxymethyloxetane, 3-methyl-3-hydroxymethyloxetane, 3-pentyl-3-hydroxymethyl oxetane, 3-hexadecyl-3-hydroxymethyloxetane, 3-phenyl-3-hydroxymethyloxetane, 3-p-tolyl-3-hydroxymethyloxetane, 3-benzyl-3-hydroxymethyloxetane, 3-chloromethyl-3-hydroxymethyloxetane, 3-bromomethyl-3-hydroxymethyloxetane, 3-fluoromethyl-3-hydroxymethyloxetane, 3-cyanomethyl-3-hydroxymethyloxetane, 3-methoxymethyl-3-hydroxymethyloxetane, 3-ethoxymethyl-3- hydroxymethyloxetane, 3-butoxymethyl-3-hydroxymethyloxetane, 3-octadecyloxymethyl-3-hydroxymethyloxetane, 3-phenyloxy-3-hydroxymethyloxetane, 3-p-tolyloxy-3-hydroxymethyloxetane, 3-benzyloxy-3-hydroxymethyloxetane, 3-acetyloxy-3-hydroxymethyloxetane, 3-oleyloxy-3-hydroxymethyloxetane, 3-stearyloxy-3-hydroxymethyloxetane, 3-ethyl-3-hydroxyoxetane, 3-methyl-3-hydroxyoxetane, 3,3-bis-hydroxymethyloxetane and p-(3-ethyloxetanyl-3-oxymethyl)-phenol.

Particularly preferred examples of alcohols or phenols containing oxetane groups are 3-ethyl-3-hydroxymethyloxetane, 3-pentyl-3-hydroxymethyloxetane, 3,3-bishydroxymethyloxetane and p-(3-ethyloxetanyl-3-oxymethyl)-phenol.

Examples of alcohols or phenols which are free from oxetane groups are decyl alcohol, stearyl alcohol, benzyl alcohol, glycol, trimethylolpropane, pentaerythritol, sorbitol, neopentyl glycol, dimethylolcyclohexane, diethylene glycol, thiodiglycol, phenol, p-chlorophenol, p-nonylphenol, pyrocatechol, di-t-butylpyrocatechol and 2,2-bis-(4-hydroxyphenyl)-propane.

Examples of phosphites containing oxetane groups are tris-[(3-ethyloxetan-3-yl)-methyl]phosphite, bis-[(3-ethyloxetan-3-yl)-methyl]phosphite, mono-[(3-ethyloxetan-3-yl)-methyl]phosphite, tris-[(3-pentyloxetan-3-yl)-methyl]phosphite, bis-[(3-pentyloxetan-3-yl)-methyl]phosphite, tris-[(3-hexadecyloxetan-3-yl)-methyl]phosphite, bis-[(3-hexadecyloxetan-3-yl)-methyl]phosphite, tris-[(3-phenyloxetan-3-yl)-methyl]phosphite, bis-[(3-phenyloxetan-3-yl)-methyl]phosphite, tris-[(3-p-tolyloxetan-3-yl)-methyl]phosphite, bis-[(3-p-tolyloxetan-3-yl)-methyl]phosphite, tris-[(3-benzyloxetan-3-yl)-methyl]phosphite, bis-[(3-benzyloxetan-3-yl)-methyl]phosphite, phenyl bis-[(3-ethyloxetan-3-yl)-methyl]phosphite, 2-phenoxy-spiro(1,3,2-dioxaphosphorinan-5,3'-oxetane), 3,3-bis-[spiro(oxetan-3',5"-(1",3",2"-dioxa-2"-phosphorinan))-oxy-methyl]-oxetane and P,P'-[(1-methylethylidene)di-4,1-phenylene]-P,P,P',P'-tetrakis[(3-ethyl-3-oxetanyl)-methyl]phosphite. Further suitable examples are disclosed in U.S. Pat. No. 3,209,013.

Particularly preferred phosphites containing oxetane groups are tris-[(3-ethyloxetan-3-yl)-methyl]phosphite, bis-[(3-ethyloxetan-3-yl)-methyl]phosphite, mono-[(3-ethyloxetan-3-yl)-methyl]phosphite, tris-[(3-pentyloxetan-3-yl)-methyl]phosphite, bis-[(3-pentyloxetan-3-yl)-methyl]phosphite, phenyl bis-[(3-ethyloxetan-3-yl)-methyl]phosphite, 2-phenoxy-spiro(1,3,2-dioxaphosphorinan-5,3'-oxetane), 3,3-bis-[spiro(oxetan-3',5"-(1",3",2"-dioxa-2"-phosphorinan))-oxy-methyl]-oxetane and P,P'-[(1-methylethylidene)di-4,1-phenylene]-P,P,P',P'-tetrakis[(3-ethyl-3-oxetanyl)-methyl]phosphite.

Very particularly preferred phosphites containing oxetane groups are tris-[(3-ethyloxetan-3-yl)-methyl]phosphite, bis-[(3-ethyloxetan-3-yl)-methyl]phosphite or mono-[(3-ethyloxetan-3-yl)-methyl]phosphite, and mixture comprising these or mixtures of these.

In particularly preferred embodiments of the invention, the plastics composition for the production of the layer (B) comprises at least tris-[(3-ethyloxetan-3-yl)-methyl]phosphite as the phosphite.

The abovementioned phosphites containing oxetane groups are known to the person skilled in the art and are described in the literature as stabilizers for halogenated polymers (cf. U.S. Pat. No. 3,209,013) or polycarbonates (cf. DE-A 2 140 207). Their surprising influence on the colour intensity of dye diffusion thermal transfer printing images on special polyester layers, however, has not hitherto been described in the literature.

The plastics composition for the layer (B) preferably comprises the phosphites in an amount of from 0.005 to 2 wt. %, particularly preferably from 0.01 to 1 wt. %, very particularly preferably from 0.05 to 0.5 wt. %-based on the total weight of the plastics composition for the layer (B).

The phosphites added to the plastics composition can at least partly hydrolyse or be oxidized, i.e. in the case of oxidation a transition from oxidation stage +III of the phosphorus into oxidation stage +V takes place, during the processing of the plastics composition to give the layer (B) or also subsequently in the finished layer (B).

In further preferred embodiments, the layer (B) can preferably comprise at least one blue or violet dyestuff. It particularly preferably comprises such a dyestuff in an amount of from 0.1 to 100 ppm, particularly preferably from 0.5 to 50 ppm, very particularly preferably 1.0 to 30 ppm, based on the total weight of the plastics composition for the layer (B).

Possible suitable blue or violet dyestuffs are all the blue or violet dyestuffs known to the person skilled in the art which can be incorporated into plastics compositions and survive the processing temperatures, for example during extrusion. Blue or violet anthraquinone dyestuffs, for example those of the Makrolex® series, are preferably possible. There may be mentioned by way of example as possible for this Makrolex® Violet 3R (Solvent Violet 36) or 1,4-bis-[(2,6-diethyl-4-methylphenyl)-amino]-9,10-anthracenedione (Macrolex® Blue RR).

Possible thermoplastics for the layer (A) independently of each other are thermoplastics chosen from polymers of ethylenically unsaturated monomers and/or polycondensates of bifunctional reactive compounds. For certain uses, it may be advantageous to employ a transparent thermoplastic. In particularly preferred embodiments, the layers of plastic mentioned can unanimously have at least one thermoplastic chosen from the abovementioned groups.

Particularly suitable thermoplastics are polycarbonates or copolycarbonates based on diphenols, poly- or copolyacrylates and poly- or copolymethacrylates, such as, by way of example and preferably, polymethyl methacrylate, poly- or copolymers with styrene, such as, by way of example and preferably, transparent polystyrene or polystyrene/acrylonitrile (SAN), transparent thermoplastic polyurethanes, and polyolefins, such as, by way of example and preferably, transparent polypropylene types or polyolefins based on cyclic olefins (e.g. TOPAS®, Hoechst) or polyolefin-based materials, such as e.g. Teslin®, poly- or copolycondensates of terephthalic acid or naphthalenedicarboxylic acid, such as, by way of example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN) or mixtures of the abovementioned.

Polycarbonates or copolycarbonates, in particular having average molecular weights $M_w$ of from 500 to 100,000, preferably from 10,000 to 80,000, particularly preferably from 15,000 to 40,000, or blends comprising at least one such polycarbonate or copolycarbonate are very particularly preferred. Blends of the abovementioned polycarbonates or copolycarbonates with at least one poly- or copolycondensate of terephthalic acid, in particular at least one such poly- or copolycondensate of terephthalic acid having average molecular weights $M_w$ of from 10,000 to 200,000, preferably from 26,000 to 120,000, are furthermore also preferred. In particularly preferred embodiments of the invention, the blend is a blend of polycarbonate or copolycarbonate with poly- or copolybutylene terephthalate. Such a blend of polycarbonate or copolycarbonate with poly- or copolybutylene terephthalate can preferably be one with 1 to 90 wt. % of polycarbonate or copolycarbonate and 99 to 10 wt. % of poly- or copolybutylene terephthalate, preferably with 1 to 90 wt. % of polycarbonate and 99 to 10 wt. % of polybutylene terephthalate, the contents adding up to 100 wt. %. Such a blend of polycarbonate or copolycarbonate with poly- or copolybutylene terephthalate can particularly preferably be one with 20 to 85 wt. % of polycarbonate or copolycarbonate and 80 to 15 wt. % of poly- or copolybutylene terephthalate, preferably with 20 to 85 wt. % of polycarbonate and 80 to 15 wt. % of polybutylene terephthalate, the contents adding up to 100 wt. %. Such a blend of polycarbonate or copolycarbonate with poly- or copolybutylene terephthalate can very particularly preferably be one with 35 to 80 wt. % of polycarbonate or copolycarbonate and 65 to 20 wt. % of poly- or copolybutylene terephthalate, preferably with 35 to 80 wt. % of polycarbonate and 65 to 20 wt. % of polybutylene terephthalate, the contents adding up to 100 wt. %.

In preferred embodiments, particularly suitable polycarbonates or copolycarbonates are aromatic polycarbonates or copolycarbonates.

The polycarbonates or copolycarbonates can be linear or branched in a known manner.

The preparation of these polycarbonates can be carried out in a known manner from diphenols, carbonic acid derivatives, optionally chain terminators and optionally branching agents by means of solution or interfacial condensation or melt condensation. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (I)

wherein Z is an aromatic radical having 6 to 34 C atoms, which can comprise one or more optionally substituted aromatic nuclei and aliphatic or cycloaliphatic radicals or alkylaryls or hetero atoms as bridge members.

Particularly preferred dihydroxyaryl compounds are resorcinol, 4,4'-dihydroxydiphenyl, bis-(4-hydroxyphenyl)-diphenylmethane, 1,1-bis-(4-hydroxyphenyl)-1-phenylethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethylcyclohexane, 1,1'-bis-(4-hydroxyphenyl)-3-diisopropylbenzene and 1,1'-bis-(4-hydroxyphenyl)-4-diisopropylbenzene.

Very particularly preferred dihydroxyaryl compounds are 4,4'-dihydroxydiphenyl, 2,2-bis-(4-hydroxyphenyl)-propane and bis-(4-hydroxyphenyl)-3,3,5-trimethylcyclohexane.

A very particularly preferred copolycarbonate can be prepared using 1,1-bis-(4-hydroxyphenyl)-3,3,5-trimethylcyclohexane and 2,2-bis-(4-hydroxyphenyl)-propane.

Suitable carbonic acid derivatives can be, for example, for the preparation by means of solution condensation, in particular interfacial condensation, phosgene, or, for the preparation by means of melt condensation, diaryl carbonates of the general formula (II)

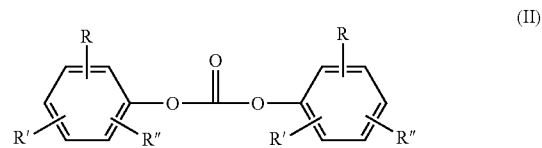

wherein

R, R' and R" independently of each another are identical or different and represent hydrogen, linear or branched $C_1$-$C_{34}$-alkyl, $C_7$-$C_{34}$-alkylaryl or $C_6$-$C_{34}$-aryl, and R can furthermore also denote —COO—R''', wherein R''' represents hydrogen, linear or branched $C_1$-$C_{34}$-alkyl, $C_7$-$C_{34}$-alkylaryl or $C_6$-$C_{34}$-aryl.

Particularly preferred diaryl compounds are diphenyl carbonate, 4-tert-butylphenyl phenyl carbonate, di-(4-tert-butylphenyl) carbonate, biphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl]carbonate and di-(methyl salicylate) carbonate.

Diphenyl carbonate is very particularly preferred.

Either one diaryl carbonate or different diaryl carbonates can be used

One or more monohydroxyaryl compound(s) which has/have not been used for the preparation of the diaryl carbonate(s) used can additionally be employed, for example, as chain terminators to control or modify the end groups. These can be those of the general formula (III)

wherein $R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and $R^B$, $R^C$ independently of each other are identical or different and represent hydrogen, linear or branched $C_1$-$C_{34}$-alkyl, $C_7$-$C_{34}$-alkylaryl or $C_6$-$C_{34}$-aryl.

4-tert-Butylphenol, 4-iso-octylphenol and 3-pentadecylphenol are preferred.

Suitable branching agents can be compounds having three and more functional groups, preferably those having three or more hydroxyl groups.

Preferred branching agents are 3,3-bis-(3-methyl-4-hydroxyphenyl)-2-oxo-2,3-dihydroindole and 1,1,1-tri-(4-hydroxyphenyl)-ethane.

Suitable poly- or copolycondensates of terephthalic acid or naphthalenedicarboxylic acid for the layer (A) are, for example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN) or mixture of the abovementioned.

The poly- or copolycondensates of terephthalic acid or naphthalenedicarboxylic acid for the layer (A) can be the poly- or copolycondensate(s) of terephthalic acid or naphthalenedicarboxylic acid comprising cyclohexane-1,4-dimethanol radicals already mentioned above, or poly- or copolycondensate(s) of terephthalic acid or naphthalenedicarboxylic acid which comprise no radicals of cyclohexane-1,4-dimethanol or comprise these outside the stated ranges of substance amounts. Mixtures of these are also possible.

In preferred embodiments of the invention, suitable poly- or copolycondensates of terephthalic acid or naphthalenedicarboxylic acid are polyalkylene terephthalates or polyalkylene naphthalates. Suitable polyalkylene terephthalates or polyalkylene naphthalates are, for example, reaction products of aromatic dicarboxylic acids or their reactive derivatives (e.g. dimethyl esters or anhydrides) and aliphatic, cycloaliphatic or araliphatic diols and mixtures of these reaction products.

Preferred poly- or copolycondensates of terephthalic acid or naphthalenedicarboxylic acid can be prepared from terephthalic acid or naphthalene-2,6-dicarboxylic acid (or their reactive derivatives) and aliphatic or cycloaliphatic diols having 2 to 10 C atoms by known methods (Kunststoff-Handbuch, vol. VIII, p. 695 et seq., Karl-Hanser-Verlag, Munich 1973).

Preferred poly- or copolycondensates of terephthalic acid or naphthalenedicarboxylic acid comprise at least 80 mol %, preferably 90 mol % of radicals which result from the use of terephthalic acid or naphthalenedicarboxylic acid, based on the dicarboxylic acid component, in the preparation and at least 80 mol %, preferably at least 90 mol % of radicals which result from the use of ethylene glycol, cyclohexane-1,4-dimethanol and/or butane-1,4-diol, based on the diol component, in the preparation.

The preferred poly- or copolycondensates of terephthalic acid or naphthalenedicarboxylic acid can comprise, in addition to terephthalic acid radicals or naphthalenedicarboxylic acid radicals, up to 20 mol % of radicals of other aromatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid (in the case of polyalkylene terephthalates), terephthalic acid (in the case of polyalkylene naphthalates), 4,4'-diphenyldicarboxylic acid, succinic, adipic, sebacic acid, azelaic acid and/or cyclohexanediacetic acid.

The preferred poly- or copolycondensates of terephthalic acid or naphthalenedicarboxylic acid can comprise, in addition to radicals of ethylene glycol, butane-1,4-diol and/or cyclohexane-1,4-dimethanol, up to 20 mol % of radicals of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di-([beta]-hydroxyethoxy)-benzene, 2,2-bis-(4-hydroxycyclohexyl)-propane, 2,4-dihydroxy-1,1,3,3-tetramethylcyclobutane, 2,2-bis-(3-[beta]-hydroxyethoxyphenyl)-propane and 2,2-bis-(4-hydroxypropoxyphenyl)-propane (cf. DE-A 24 07 674, 24 07 776, 27 15 932).

Particularly preferred poly- or copolycondensates of terephthalic acid or naphthalenedicarboxylic acid comprise as radicals of one or more diol components those of cyclohexane-1,4-dimethanol. The particularly preferred polyalkylene terephthalates or polyalkylene naphthalates preferably comprise such radicals of cyclohexane-1,4-dimethanol to the extent of a content of at least 15 mol %, particularly preferably of at least 20 mol %, very particularly preferably of at least 30 mol %, based on the diol component. Preferably, the particularly preferred polyalkylene terephthalates or polyalkylene naphthalates comprise such radicals of cyclohexane-1,4-dimethanol to the extent of a content of at most 95 mol %, particularly preferably of at most 90 mol %, very particularly preferably of at most 80 mol %, based on the diol component. Furthermore preferably, the particularly preferred polyalkylene terephthalates or polyalkylene naphthalates comprise such radicals of cyclohexane-1,4-dimethanol to the extent of a content of from 15 to 95 mol %, particularly preferably from 20 to 90 mol %, very particularly preferably from 30 to 80 mol %, based on the diol component.

The poly- or copolycondensates of terephthalic acid or naphthalenedicarboxylic acid can be branched by incorporation of relatively small amounts of 3- or 4-functional alcohols or 3- or 4-basic carboxylic acids, such as are described e.g. in DE-A 19 00 270 and U.S. Pat. No. 3,692,744. Examples of preferred branching agents are trimesic acid, trimellitic acid, trimethylolethane and -propane and pentaerythritol. Preferably, not more than 1 mol % of the branching agent, based on the acid component, is used.

Polyalkylene terephthalates which have been prepared solely from terephthalic acid and reactive derivatives thereof (e.g. dialkyl esters thereof) and ethylene glycol, cyclohexane-1,4-dimethanol and/or butane-1,4-diol, and mixtures comprising such polyalkylene terephthalates or polyalkylene naphthalates which have been prepared solely from naphthalenedicarboxylic acid and reactive derivatives thereof (e.g. dialkyl esters thereof) and ethylene glycol, cyclohexane-1,4-dimethanol and/or butane-1,4-diol are very particularly preferred.

Of the poly- or copolycondensates of terephthalic acid or naphthalenedicarboxylic acid, the poly- or copolycondensates of terephthalic acid are particularly preferred.

Particularly preferred polyalkylene terephthalates are also copolyesters which are prepared from at least two of the abovementioned acid components and/or from at least two of the abovementioned alcohol components, and particularly preferred copolyesters are poly(ethylene glycol/cyclohexane-1,4-dimethanol) terephthalates.

The poly- or copolycondensates of terephthalic acid or naphthalenedicarboxylic acid preferably have an intrinsic viscosity of from approx. 0.4 to 1.5 dl/g, preferably from 0.5 to 1.3 dl/g, in each case measured in phenol/tetrachloroethane (1:1 parts by wt.) at 25° C.

Layer (A) can preferably be a white or translucent layer.

A white or translucent layer (A) is preferably a layer coloured white with pigments or having a filler content of fillers. Such layers, preferably layers of plastic, coloured white or having a filler content of fillers preferably comprise titanium dioxide, zirconium dioxide, barium sulfate or glass fibres as pigments and/or fillers. The pigments or fillers mentioned are preferably added to the plastics before the shaping to give the layer (A), which can be carried out, for example, by extrusion or coextrusion, in amounts of from 2 to 60 wt. %, particularly preferably from 10 to 40 wt. %, based on the total weight of pigment or filler and plastics material. A white or translucent layer (A) can also be a layer of Teslin®.

In preferred embodiments of the invention, the layer construction according to the invention comprises at least two layers (B), the or at least one layer (A) being between two layers (B).

The layer construction according to the invention can have one or more further layer(s) comprising at least one thermoplastic between the layer (A) and the layer(s) (B). These can be translucent or white layers, transparent layers or coloured layers.

Translucent layers in the context of this invention are understood as meaning those layers having a transmission in the visible wavelength range of from 380 nm to 780 nm of less than 50%, preferably of less than 35%, particularly preferably of less than 25%, in very particularly preferred embodiments of less than 15%.

Transparent layers in the context of this invention are understood as meaning those layers having a transmission in the visible wavelength range of from 380 nm to 780 nm of greater than 50%, preferably of greater than 65%, particularly preferably of greater than 75%, in very particularly preferred embodiments of greater than 85%.

Layer (A) and/or one of the further layers comprising at least one thermoplastic can comprise at least one laser-sensitive additive. Suitable laser-sensitive additives are, for example, those already mentioned for the layer (B).

In preferred embodiments, the layer (A) comprises as a thermoplastic at least one polycarbonate or copolycarbonate and the polyester component of the layer(s) (B) comprises at least one poly- or copolycondensate of terephthalic acid or naphthalenedicarboxylic acid comprising cyclohexane-1,4-dimethanol units, preferably at least one poly- or copoly-condensate of terephthalic acid comprising cyclohexane-1,4-dimethanol units, very particularly preferably at least one glycol-modified poly- or copolycondensate of terephthalic acid (PETG) comprising cyclohexane-1,4-dimethanol units. Particularly preferably, in these preferred embodiments of the invention the layer (B) comprises a laser-sensitive additive in the or at least one layer (B). Particularly preferably, the layer (A) and the layer(s) (B) in these preferred embodiments of the invention are transparent layers.

In further preferred embodiments, the layer (A) comprises as a thermoplastic at least one polycarbonate or copolycarbonate, the layer (A) being coloured white with pigments or having a filler content of fillers, i.e. being white or translucent, and the polyester component of the layer(s) (B) comprises at least one poly- or copolycondensate of terephthalic acid or naphthalenedicarboxylic acid comprising cyclohexane-1,4-dimethanol units, preferably at least one poly- or copolycondensate of terephthalic acid comprising cyclohexane-1,4-dimethanol units, very particularly preferably at least one glycol-modified poly- or copolycondensate of terephthalic acid (PETG) comprising cyclohexane-1,4-dimethanol units. Particularly preferably, in these preferred embodiments of the invention the layer (B) comprises a laser-sensitive additive in the or at least one layer (B). Particularly preferably, the layer(s) (B) in these preferred embodiments of the invention are transparent layers.

In preferred embodiments, the layer (A) comprises as a thermoplastic at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and the polyester component of the layer(s) (B) comprises at least one poly- or copolycondensate of terephthalic acid or naphthalenedicarboxylic acid comprising cyclohexane-1,4-dimethanol units, preferably at least one poly- or copoly-condensate of terephthalic acid comprising cyclohexane-1,4-dimethanol units, very particularly preferably at least one glycol-modified poly- or copolycondensate of terephthalic acid (PETG) comprising cyclohexane-1,4-dimethanol units. Particularly preferably, in these preferred embodiments of the invention the or at least one layer (B) comprises a laser-sensitive additive. Particularly preferably, the layer (A) and the layer(s) (B) in these preferred embodiments of the invention are transparent layers.

In further preferred embodiments, the layer (A) comprises as a thermoplastic at least one poly- or copolycondensate of terephthalic acid or naphthalenedicarboxylic acid, preferably a poly- or copolycondensate of terephthalic acid, very particularly preferably a glycol-modified poly- or copoly-condensate of terephthalic acid (PETG), the layer (A) being coloured white with pigments or having a filler content of fillers, and the polyester component of the layer(s) (B) comprises at least one poly- or copolycondensate of terephthalic acid or naphthalenedicarboxylic acid comprising cyclohexane-1,4-dimethanol units, preferably at least one poly- or copolycondensate of terephthalic acid comprising cyclohexane-1,4-dimethanol units, very particularly preferably at least one glycol-modified poly- or copolycondensate of terephthalic acid (PETG) comprising cyclohexane-1,4-dimethanol units. Particularly preferably, in these preferred embodiments of the invention the or at least one layer (B) comprises a laser-sensitive additive. Particularly preferably, the layer(s) (B) in these preferred embodiments of the invention are transparent layers.

The layer(s) (A) in the abovementioned preferred embodiments can also comprise as a thermoplastic a blend of at least one poly- or copolycondensate of terephthalic acid or naphthalenedicarboxylic acid and at least one polycarbonate or copolycarbonate. Preferably, this is a blend of polycarbonate or copolycarbonate with poly- or copolybutylene terephthalate.

In the abovementioned preferred embodiments, at least one phosphite can furthermore be added to the plastics compositions for the production of the layer(s) (B).

The layer(s) (B) in the abovementioned preferred embodiments can preferably furthermore comprise at least one polycarbonate or copolycarbonate.

The layers present according to the invention, layer (A), layer (B) and further layers comprising at least one thermoplastic, preferably have in each case a thickness of from 20 µm to 850 µm, particularly preferably in each case a thickness of from 25 µm to 700 µm, very particularly preferably in each case a thickness of from 30 µm to 500 µm. In this context, several layers can have the same or all layers can have different layer thicknesses. Preferably, the layer(s) (B) has or have a layer thickness of from 10 µm to 300 µm, particularly preferably in each case a thickness of from 12.5 µm to 200 µm, very particularly preferably from 15 µm to 150 µm. Preferably, the layer (A) has a layer thickness of from 20 µm to 750 µm, particularly preferably in each case a thickness of from 50 µm to 700 µm, very particularly preferably from 75 µm to 650 µm.

The layer construction according to the invention can be produced by a procedure in which the various films of plastic are bonded to one another by means of lamination, or the layer construction is produced by means of coextrusion.

The layer construction according to the invention—preferably in the case of production by coextrusion—can also be a film of plastic.

The present invention therefore also provides a process for the production of a layer construction, in which various films of plastic are bonded to one another by means of lamination or the layer construction is produced by means of coextrusion.

In the case of lamination, the individual films, e.g. at least one film of plastic for the layer (B) and one film of plastic for the layer (A) and optionally further films of plastic for further layers, are laid on top of one another in the desired sequence and bonded to one another by means of lamination. The processes of lamination and of coextrusion can also be combined in the process according to the invention in that individual films for the lamination already have several layers produced by coextrusion.

In particular, films of plastic for the production of the layer (B) which can be employed for the production of the layer construction according to the invention, for example in the process according to the invention, have not hitherto been described in the literature.

Such films of plastic for the layer (B) are produced from a plastics composition comprising the poly- or copolycondensate(s) of terephthalic acid or naphthalenedicarboxylic acid of the cyclohexane-1,4-dimethanol-modified polyester component. The production is preferably carried out by means of extrusion.

The present invention therefore preferably provides a process for the production of a layer construction according to the invention, in which
- at least one film of plastic or at least one layer of a film of plastic is produced from a plastics composition comprising at least one poly- or copolycondensate of terephthalic acid or naphthalenedicarboxylic acid of the cyclohexane-1,4-dimethanol-modified polyester component
- at least one of these films of plastic is laid together with a film of plastic for the layer (A) and optionally one or more further films of plastic in the desired sequence to give a film stack
- and these films are bonded to one another by means of lamination with one another to give a layer construction.

In the sequence of laying the films of plastic on one another, the film of plastic or the layer of the film of plastic produced from the plastics composition comprising the cyclohexane-1,4-dimethanol-modified polyester component is one of the two outer layers. In the case where more than one of these films of plastic are employed, preferably both the outer layers are formed from one of these films of plastic or a layer of this film of plastic produced from a plastics composition comprising the polyester component according to the invention.

A process for the production of a layer construction according to the invention in which at least one layer (B) and at least one layer (A) are produced by means of coextrusion, a plastics composition comprising the polyester component according to the invention being used for the coextrusion of the layer (B), is furthermore preferred.

The present invention therefore likewise provides a single- or multilayer film of plastic comprising at least one layer comprising a polyester component comprising at least one poly- or copolycondensate of terephthalic acid or naphthalenedicarboxylic acid, wherein the polyester component comprises radicals of cyclohexane-1,4-dimethanol in an amount of from 25 to 75 mol %, based on the radicals of the diol component(s) in all the polyesters which the polyester component comprises, preferably based on the radicals of the diol component(s) in all the poly- or copolycondensate(s) of terephthalic acid or naphthalenedicarboxylic acid which the polyester component comprises.

In preferred embodiments, the film of plastic according to the invention is a single-layer film—also called a monofilm—which consists of the layer comprising the cyclohexane-1,4-dimethanol-modified polyester component. The poly- or copolycondensates of terephthalic acid or naphthalenedicarboxylic acid mentioned above for the layer construction according to the invention are possible for the cyclohexane-1,4-dimethanol-modified polyester component.

In this context, the monofilm according to the invention preferably has a thickness of from 20 to 300 μm, particularly preferably from 30 to 200 μm, very particularly preferably from 40 to 150 μm.

In preferred embodiments of the invention, the monofilm according to the invention can have at least one laser-sensitive additive, the laser-sensitive additives already mentioned above for the layer construction according to the invention being possible for this.

Such a monofilm can be produced, for example, by extruding a plastics composition comprising the cyclohexane-1,4-dimethanol-modified polyester component to form a film.

In further preferred embodiments of the invention, the film of plastic according to the invention is an at least two-layer film which, in addition to the layer (B) comprising the cyclohexane-1,4-dimethanol-modified polyester component, has at least one further layer (A) comprising at least one thermoplastic. In this context, the thermoplastics can be those already mentioned above for the layer construction according to the invention. Particularly preferred embodiments of the film of plastic according to the invention having at least two layers are those films of plastic which have at least one layer (A) comprising at least one thermoplastic and at least two layers (B) comprising the cyclohexane-1,4-dimethanol-modified polyester component, at least one layer (A) being between two layers (B).

In this context, the at least two-layer film according to the invention preferably has a total thickness of from 20 μm to 850 μm, particularly preferably in each case a thickness of from 25 μm to 700 μm, very particularly preferably in each case a thickness of from 30 μm to 500 μm. Preferably, the layer(s) (B) has or have a layer thickness of from 10 μm to 300 μm, particularly preferably in each case a thickness of from 12.5 μm to 200 μm, very particularly preferably from 15 μm to 150 μm. Preferably, the layer (A) has a layer thickness of from 20 μm to 750 μm, particularly preferably in each case a thickness of from 50 μm to 700 μm, very particularly preferably from 75 μm to 650 μm.

In preferred embodiments of the invention, the at least two-layer film according to the invention can have at least one laser-sensitive additive in at least one layer, the laser-sensitive additives already mentioned above for the layer construction according to the invention being possible for this. The at least two-layer film according to the invention can have at least one laser-sensitive additive in at least one layer (A). Alternatively, the at least two-layer film according to the invention can have at least one laser-sensitive additive in the or at least one of the layers (B). The at least two-layer film according to the invention can also have at least one laser-sensitive additive both in at least one layer (A) and in the or at least one of the layers (B).

In preferred embodiments of the invention, the at least two-layer film according to the invention can comprise as a thermoplastic in the or at least one of the further layer(s) (A) at least one polycarbonate or copolycarbonate or at least one poly- or copolycondensate of terephthalic acid or naphthalenedicarboxylic acid.

Preferably, the or at least one of the further layer(s) (A) can be coloured white with pigments or have a filler content of fillers, i.e. can be white or translucent.

The at least two-layer films of plastic can be produced, for example, by coextrusion or by lamination.

In very particularly preferred embodiments of the film of plastic according to the invention—both of the monofilms and of the at least two-layer films—at least one phosphite can have been added to the plastics composition for the production of the layer(s) (B).

In further very particularly preferred embodiments of the film of plastic according to the invention—both of the monofilms and of the at least two-layer films—the layer or the layer(s) (B) additionally comprise(s) at least one polycarbonate or copolycarbonate based on diphenols, the layer(s) preferably comprising the polycarbonate(s) or copolycarbonate(s) in an amount of 30 wt. % or less, particularly preferably from 0.1 to 25 wt. %, very particularly preferably from 0.5 to 20 wt. %, based on the total weight of the plastics composition of the particular layer. In this context, possible polycarbonate(s) or copolycarbonate(s) are those already mentioned above for the layer constructions according to the invention.

Examples of embodiments of the film of plastic according to the invention are mentioned in the following, where these are not to be understood as meaning a limitation of the invention.

Examples of Monofilms:

Film comprising a polyester component comprising at least one poly- or copolycondensate of terephthalic acid or naphthalenedicarboxylic acid, preferably of terephthalic acid, comprising at least one cyclohexane-1,4-dimethanol unit.

Film comprising a polyester component comprising at least one poly- or copolycondensate of terephthalic acid or naphthalenedicarboxylic acid, preferably of terephthalic acid, comprising at least one cyclohexane-1,4-dimethanol unit, and at least one polycarbonate or copolycarbonate based on diphenols.

Film comprising a polyester component comprising at least one poly- or copolycondensate of terephthalic acid or naphthalenedicarboxylic acid, preferably of terephthalic acid, comprising at least one cyclohexane-1,4-dimethanol unit, at least one polycarbonate or copolycarbonate based on diphenols and at least one laser-sensitive additive.

In the abovementioned embodiments given by way of example, at least one phosphite can have been added to the plastics composition for the production of the monofilm.

Examples of 2-Layer Films:

Film comprising a layer (B) having a composition according to the abovementioned monofilms and a further layer (A) comprising at least one poly- or copolycondensate of terephthalic acid or naphthalenedicarboxylic acid, preferably of terephthalic acid, and/or at least one polycarbonate or copolycarbonate based on diphenols.

Film comprising a layer (B) having a composition according to the abovementioned monofilms and a further layer (A) comprising at least one poly- or copolycondensate of terephthalic acid or naphthalenedicarboxylic acid, preferably of terephthalic acid, and/or at least one polycarbonate or copolycarbonate based on diphenols, wherein the further layer is white or translucent.

Examples of 3-Layer Films:

Film comprising two layers (B) having a composition according to the abovementioned monofilms and a further layer (A), arranged between these two layers (B), comprising at least one poly- or copolycondensate of terephthalic acid or naphthalenedicarboxylic acid, preferably of terephthalic acid, and/or at least one polycarbonate or copolycarbonate based on diphenols.

Film comprising two layers (B) having a composition according to the abovementioned monofilms and a further layer (A), arranged between these two layers (B), comprising at least one poly- or copolycondensate of terephthalic acid or naphthalenedicarboxylic acid, preferably of terephthalic acid, and/or at least one polycarbonate or copolycarbonate based on diphenols, wherein the further layer is white or translucent.

In addition to the production of the layer construction according to the invention, the film of plastic according to the invention inter alia is also already suitable itself as a dye acceptor film in dye diffusion thermal transfer printing.

The layer construction according to the invention or the film of plastic according to the invention furthermore is preferably suitable for the production of security and/or valuable documents.

The present invention therefore also provides a security and/or valuable document comprising at least one layer construction according to the invention, preferably comprising one layer construction according to the invention.

Preferably, the security and/or valuable document according to the invention is an identification document, preferably an identity card (ID card), such as e.g. a personal identity card, passport, driving licence, a bank card, credit card, insurance card, other identity card etc.

The layer(s) comprising the cyclohexane-1,4-dimethanol-modified polyester component in the layer construction according to the invention, in the film of plastic according to the invention or in the security and/or valuable document according to the invention can be printed by means of dye diffusion thermal transfer printing. In this context, a particularly good colour intensity of the printed image is found, in contrast to other plastics compositions of the dye acceptor layers.

The present invention therefore also provides the use of a layer construction according to the invention, of a film of plastic according to the invention or of a security and/or valuable document according to the invention for printing the or at least one of the layer(s) comprising a polyester component comprising at least one poly- or copolycondensate of terephthalic acid or naphthalenedicarboxylic acid, wherein the polyester component comprises radicals of cyclohexane-1,4-dimethanol in an amount of from 25 to 75 mol %, based on the radicals of the diol component(s) in all the poly- or copolyesters which the polyester component comprises, preferably based on the radicals of the diol component(s) in all the poly- or copolycondensates of terephthalic acid or naphthalenedicarboxylic acid which the polyester component comprises, by means of dye diffusion thermal transfer printing.

In this context, the layer(s) comprising the cyclohexane-1,4-dimethanol-modified polyester component in the layer construction according to the invention, in the film of plastic according to the invention or in the security and/or valuable document according to the invention have outstanding colour receiver properties. In the case of printing by means of dye diffusion thermal transfer printing, it has been found, surprisingly, that the printing ink penetrates into these layer(s) into a depth of more than 30 μm, preferably even of more than 50 μm, provided that the layer thickness of the layer in question exceeds the 30 μm, preferably the 50 μm. For printing by means of dye diffusion thermal transfer printing, in preferred embodiments it may therefore be advantageous to choose a layer thickness of the layer(s) (B) in the layer constructions or security and/or valuable documents according to the invention or a layer thickness of the corresponding layer(s) in the films of plastic according to the invention of at least 30 μm, preferably of at least 50 μm. As a result, the colour intensity of the printed image can be improved still further compared with thinner layers.

The following examples serve to explain the invention by way of example and are not to be interpreted as a limitation.

EXAMPLES

Raw Materials

Makrolon® 3108

Makrolon® 3108 highly viscous amorphous, thermoplastic bisphenol A polycarbonate having an MVR of 6 g/10 min in accordance with ISO 1133 at 300° C. and 1.2 kg from Bayer MaterialScience AG.

APEC® 9379

Trimethylcyclohexyl (TMC)-bisphenol-bisphenol A copolycarbonate APEC® 9379 having an MFR of 8 g/10 min in accordance with ISO 1133 at 330° C. and 2.16 kg.

Plexiglas® 8N

Plexiglas 8N an amorphous, thermoplastic moulding composition (PMMA) having an MFR of 3 g/10 min in accordance with ISO 1133 at 230° C. and 3.8 kg from Röhm GmbH & Co KG Tritan™ FX 100

Tritan™ FX 100 is an amorphous copolyester having an intrinsic viscosity of 0.71 dl/g (measured in a 1:1 mixture of phenol and tetrachloroethane at 25° C.) from Eastman Chemical (comprises 77-78 mol % of cyclohexane-1,4-dimethanol radicals, based on the diol component)

Eastar™ DN 001

A polyester of terephthalic acid of 54.9 wt. % of terephthalic acid, 9.3 wt. % (38 mol %, based on the diol component) of ethylene glycol and 35.8 wt. % (62 mol %, based on the diol component) of cyclohexane-1,4-dimethanol, having an intrinsic viscosity of 0.74 dl/g (measured in a 1:1 mixture of phenol and tetrachloroethane at 25° C.), was used as the poly- or copolycondensate of terephthalic acid.

Eastar™ PCT 13787

Polycondensate of terephthalic acid of 53.5 wt. % (100 mol %, based on the diol component) of terephthalic acid and 46.5 wt. % (100 mol %, based on the diol component) of cyclohexane-1,4-dimethanol.

Preparation or Provision of the Masterbatches (Compositions) for the Production of the Layer Constructions According to the Invention Example 1

Compounding of a Masterbatch Comprising a Thermoplastic and a White Pigments as a Filler The masterbatch for the production of the layer comprising a thermoplastic and a white pigment as a filler was prepared with a conventional twin-screw compounding extruder (ZSK 32) at conventional processing temperatures for polycarbonate of from 250 to 330° C.

A masterbatch having the following composition was compounded and then granulated:

Polycarbonate Makrolon® 3108 from Bayer MaterialScience AG in a content of 85 wt. %

Titanium dioxide (Kronos® 2230 from Kronos Titan) as a white pigment filler in a content of 15 wt. %.

Production of the Layer Constructions According to the Invention:

Example 2

Production of Extruded Films

The installation used for production of the coextruded film(s) includes:

an extruder for extrusion of the layer comprising at least one polycarbonate with a screw of 60 mm diameter (D) and a length of 33 D. The screw has a devolatilization zone.

a melt pump;

a cross head;

a slot die 450 mm wide;

a triple roll polishing calender with a horizontal roll arrangement, the third roll being swivellable by +/−45° with respect to the horizontal;

a roller conveyor;

thickness measurement;

equipment for application of protective film on both sides;

a take-off device;

a winding station.

The granules were conveyed from the drier into the hopper of the extruder. Melting and conveying of the material took place in the plasticizing system of barrel/screw. From the slot die, the melt arrived at the polishing calender. Final shaping and cooling of the film took place on the polishing calender (consisting of three rolls). For embossing of the surfaces, a structured steel roll (6-face) and a structured silicone rubber roll (2-face) were employed. The rubber roll used for structuring the film surface is disclosed in U.S. Pat. No. 4,368,240 of Nauta Roll Corporation. The film was then transported through a take-off and thereafter the film was wound up.

Films with two structured sides having a layer thickness of 85 μm were extruded from this.

| Recipe | | Melting temperature |
|---|---|---|
| Example 2 (not according to the invention) | Makrolon ® 3108 | 300° C. |
| Example 3 (not according to the invention) | APEC ® 9379 | 320° C. |
| Example 4 (not according to the invention) | Plexiglas ® 8N | 230° C. |
| Example 5 (not according to the invention) | Tritan ™ FX 100 (comprises 77-78 mol % of cyclohexane-1,4-dimethanol radicals, based on the diol component) | 230° C. |
| Example 6 (not according to the invention) | Eastar ™ PCT 13787 (comprises 100 mol % of cyclohexane-1,4-dimethanol radicals, based on the diol component) | 275° C. |
| Example 7 (according to the invention) | Eastar ™ DN 001 (comprises 62 mol % of cyclohexane-1,4-dimethanol radicals, based on the diol component) | 250° C. |
| Example 8 | Blend of 33% Eastar ™ PCT 13787 + | 260° C. |

-continued

| Recipe | | Melting temperature |
|---|---|---|
| (according to the invention) | 67% Eastar™ DN 001 (comprises in total 74 mol % of cyclohexane-1,4-dimethanol radicals, based on the diol component(s)) | |
| Example 9 (not according to the invention) | Blend of 50% Eastar™ PCT 13787 + 50% Eastar™ DN 001 (comprises in total 81 mol % of cyclohexane-1,4-dimethanol radicals, based on the diol component(s)) | 270° C. |

Example 10

Production of Non-Laserable Identification Documents (ID Cards) which can be Printed by Means of Dye Diffusion Thermal Transfer Printing (According to the Invention)

a) Production of a Prelam:
Film 1-1: Film Having a White Filler Content
A polycarbonate film of thickness 125 μm based on the polycarbonate Makrolon 3108® from Bayer MaterialScience AG and titanium dioxide (Kronos® 2230 from Kronos Titan) as a white pigment filler was produced from the masterbatch from Example 1 by means of extrusion at a melt temperature of approx. 280° C.
Film 1-2: Film Having a White Filler Content
A film with the same composition as film 1-1 of thickness 400 μm was produced.
A layer construction in the form of a so-called prelam was laminated from the abovementioned films as described in the following:
Layer (1): Film 1-1; 125 μm
Layer (2): Film 1-2; 400 μm
Layer (3): Film 1-1; 125 μm
In the above experimental set-up, the layers (1) and (3) were employed in order to ensure a comparable total layer thickness of the laminated card (cf. ISO IEC 7810:2003). A symmetric layer construction of the card was chosen in order to avoid distortion of the card.
For this, in each case a stack in the abovementioned sequence was formed from the films and the lamination was carried out on a lamination press from Bürkle with the following parameters:
Preheating of the press to 175° C.
Pressing for 8 minutes under a pressure of 5 bar
Pressing for 2 minutes under a pressure of 80 bar
Cooling of the press to 38° C. and opening of the press.
b) Production of an ID Card
Films from Example 4 to 9 were laminated under the following conditions on to the prelam produced in this way:
Layer (1) Films from Example 4 to 9, 85 μm
Layer (2): Prelam
Layer (3) Films from Example 4 to 9, 85 μm
For this, in each case a stack in the abovementioned sequence was formed from the films and the lamination was carried out on a lamination press from Burkle with the following parameters:
Preheating of the press to 155° C.
Pressing for 8 minutes under a pressure of 5 bar
Pressing for 2 minutes under a pressure of 80 bar
Cooling of the press to 38° C. and opening of the press.
Films from Example 2 to 3 were laminated under the following conditions on to the prelam produced in this way:
Layer (1) Films from Example 2 to 3, 85 μm
Layer (2): Prelam
Layer (3) Films from Example 2 to 3, 85 μm
For this, in each case a stack in the abovementioned sequence was formed from the films and the lamination was carried out on a lamination press from Bürkle with the following parameters:
Preheating of the press to 190° C.
Pressing for 8 minutes under a pressure of 5 bar
Pressing for 2 minutes under a pressure of 80 bar
Cooling of the press to 38° C. and opening of the press.

Example 11

Printing of the ID Cards from Example 10 by Dye Diffusion Thermal Transfer Printing (D2T2 Printing)

Printing experiments were carried out on the ID cards from Example 10 on an installation from Nisca PR 5310 with the following parameters:
Printing mode: 4-colour printing
Colour ribbon: YMCKO02
Resolution: 300 dpi (11.8 dots/mm)
Full-Area Printing of a Coloured Image
The results showed that the contrast, and therefore the image sharpness, and the colour intensity of the coloured images introduced into the ID cards comprising the layer constructions according to the invention by means of D2T2 printing were significantly higher than in the case of the ID card from Comparative Examples 2 to 6 and 9. Not only the coloured parts of the print, but also the black parts of the print showed the significantly better contrast and the significantly better colour intensity in the ID cards from Examples 7 and 8 comprising the layer constructions according to the invention. The passages printed in black on the ID card from Examples 2 to 6 and 9, which are not according to the invention, were merely grey, whereas these passages on the ID cards from Examples 7 and 8 were an intense black. The coloured passages on the ID cards from Examples 7 and 8 showed a significantly higher colour brilliance and colour intensity, in contrast to the significantly paler colours on the ID card from Examples 3, 5, 6 and 9. The image furthermore had a high image sharpness on the ID cards from Examples 7 and 8, whereas it was blurred on the ID cards from Examples 2 to 6.

The invention claimed is:
1. A layer construction comprising
    at least one layer (A) comprising at least one thermoplastic and
    at least one layer (B) comprising a polyester component comprising at least one poly- or copolycondensate of terephthalic acid or naphthalenedicarboxylic acid,
wherein the polyester component has radicals of cyclohexane-1,4-dimethanol in an amount of from 25 to 75 mol %, based on the radicals of the diol component(s) in all the poly- or copolyesters which the polyester component comprises, wherein the at least one layer (B) comprises a phosphite, wherein the phosphite is an ester of phosphonic acid with the general structure $P(OR)_3$ and wherein the phosphite comprises an oxetane group, wherein R represents aliphatic, aromatic and/or cycloaliphatic hydrocarbon radicals, wherein the hydrocarbon radicals R can optionally also comprise hetero atoms, and wherein the aromatic hydrocarbon radicals can have further substituents.
2. The layer construction according to claim 1, wherein the polyester component has in total radicals of cyclo- hexane-1,4-dimethanol in an amount of from 30 to 75 mol %, based on the radicals of the diol component(s) in all the poly- or copolyesters which the polyester component comprises.

3. The layer construction according to claim 1, wherein the polyester component comprises poly- or copolycondensate of terephthalic acid or naphthalenedicarboxylic acid comprising one or more cyclohexane-1,4-dimethanol units, which comprise as further radicals of one of several diol components those of ethylene glycol and/or butane-1,4-diol, optionally in a mixture with poly(cyclohexane-1,4-dimethanol) terephthalate and/or poly(cyclohexane-1,4-dimethanol) naphthalate.

4. The layer construction according to at least claim 1, wherein layer (A) comprises at least one thermoplastic selected from the group consisting of polycarbonates or copolycarbonates based on diphenols, poly- or copolyacrylates and poly- or copolymethacrylates, poly- or copolymers with styrene, transparent thermoplastic polyurethanes, polyolefins, and poly- or copolycondensates of terephthalic acid or naphthalenedicarboxylic acid.

5. The layer construction according to claim 1, wherein layer (A) is a white or translucent layer.

6. The layer construction according to claim 1, wherein layer (A) is between two layers (B).

7. The layer construction according to claim 1, wherein between layer (A) and the layer(s) (B) it has at least one further layer comprising at least one thermoplastic.

8. A process for the production of a layer construction according to claim 1 comprising boding the various films of plastic to one another by means of lamination or producing the layer construction by coextrusion.

9. A security and/or valuable document, wherein the document comprises a layer construction according to claim 1.

10. The security and/or valuable document according to claim 9, wherein the document is an identification document.

11. A method comprising printing the at least one of the layer(s) (B) of a layer construction according to claim 1 by means of dye diffusion thermal transfer printing.

12. A single- or multilayer film of plastic comprising at least one layer comprising a polyester component comprising at least one poly- or copolycondensate of terephthalic acid or naphthalenedicarboxylic acid, wherein the polyester component has radicals of cyclohexane-1,4-dimethanol in an amount of from 25 to 75 mol %, based on the radicals of the diol component(s) in all the poly- or copolyesters which the polyester component comprises, wherein the at least one layer (B) comprises a phosphite, wherein the phosphite is an ester of phosphonic acid with the general structure $P(OR)_3$ and wherein the phosphite comprises an oxetane group, wherein R represents aliphatic, aromatic and/or cycloaliphatic hydrocarbon radicals, wherein the hydrocarbon radicals R can optionally also comprise hetero atoms, and wherein the aromatic hydrocarbon radicals can have further substituents.

13. The film of plastic according to claim 12, wherein the film has at least one further layer comprising at least one thermoplastic.

14. Film of plastic according to claim 12, characterized in that it has at least one layer (A) comprising at least one thermoplastic and at least two layers (B) comprising a polyester component comprising at least one poly- or copolycondensate of terephthalic acid or naphthalenedicarboxylic acid, wherein the polyester component has radicals of cyclohexane-1,4-dimethanol in an amount of from 25 to 75 mol %, based on the radicals of the diol component(s) in all the poly- or copolyesters which the polyester component comprises, at least one layer (A) being between two layers (B).

15. The layer construction according to claim 1, wherein the amount of phosphite is from 0.05 to 0.5 wt. %—based on the total weight of the polyester components of layer (B).

* * * * *